United States Patent
Inadome et al.

(10) Patent No.: US 11,007,910 B2
(45) Date of Patent: May 18, 2021

(54) VEHICLE SEAT HINGE MECHANISM

(71) Applicant: TOYOTA BOSHOKU KABUSHIKI KAISHA, Aichi-ken (JP)

(72) Inventors: Seiichiro Inadome, Aichi-ken (JP); Ko Tanaka, Aichi-ken (JP); Shunsuke Matsui, Aichi-ken (JP); Takahiro Oyama, Aichi-ken (JP); Shigeru Chiba, Aichi-ken (JP); Takashi Sakai, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/835,471

(22) Filed: Mar. 31, 2020

(65) Prior Publication Data
US 2020/0307424 A1    Oct. 1, 2020

(30) Foreign Application Priority Data
Apr. 1, 2019   (JP) .............................. JP2019-069789

(51) Int. Cl.
*B60N 2/30*   (2006.01)

(52) U.S. Cl.
CPC ............ *B60N 2/305* (2013.01); *B60N 2/3011* (2013.01)

(58) Field of Classification Search
CPC .... B60N 2/305; B60N 2/3011; B60N 2/3045; B60N 2/304; B60N 2/3038
USPC ......................................... 297/324, 311, 313
See application file for complete search history.

(56) References Cited

U.S. PATENT DOCUMENTS

| | | | |
|---|---|---|---|
| 9,487,108 B2* | 11/2016 | Pleskot | .................... B60N 2/22 |
| 2013/0328342 A1* | 12/2013 | Okimura | .................. B60N 2/22 296/66 |
| 2020/0087962 A1* | 3/2020 | Trentin | ............... E05D 11/1057 |

FOREIGN PATENT DOCUMENTS

JP    2005-186642    7/2005

OTHER PUBLICATIONS

Office Action dated Dec. 4, 2020 in counterpart German Patent Application DE 10 2020 204 153.9.

* cited by examiner

*Primary Examiner* — Mark R Wendell
(74) *Attorney, Agent, or Firm* — Greenblum & Bernstein P.L.C.

(57) ABSTRACT

A vehicle seat hinge mechanism includes:
a base portion that is fixed to a vehicle body;
a movable portion that is fixed to a vehicle seat;
a rotating shaft that is passed through the movable portion and the base portion and is welded to one of the movable portion and the base portion;
a spiral spring that is passed through the rotating shaft and applies a rotational urging force to the movable portion; and
a heat affected member that is passed through the rotating shaft and arranged with the spiral spring,
wherein the rotating shaft is divided into a first shaft portion and a second shaft portion, and
the first shaft portion includes an assembling portion that is capable of setting the heat affected member such that the heat affected member is passed from the one side.

4 Claims, 6 Drawing Sheets

VEHICLE SEAT HINGE MECHANISM

CROSS REFERENCE TO RELATED APPLICATIONS

This application is based on Japanese Patent Applications No. 2019-069789 filed on Apr. 1, 2019, the entire contents of which are incorporated herein by reference.

TECHNICAL FIELD

The present invention relates to a vehicle seat hinge mechanism. Specifically, the present invention relates to a vehicle seat hinge mechanism configured to connect a vehicle seat to a vehicle body in a manner that allows the vehicle seat to rise and recline in a rotatable manner.

BACKGROUND ART

In related art, there has been known a vehicle seat in which the entire seat is flipped forward in a state where a seat back thereof is reclined forward, so that a luggage compartment and getting-on-and-off space may be enlarged (JP-A-2005-186642). The flipping of the entire seat is performed by rotation of a pair of left and right seat hinge mechanisms, which hinge a front portion of a seat cushion to a floor, about a rotating shaft. The seat hinge mechanism is provided with a spiral spring which urges the entire seat in a direction of the flipping, and a rotary type oil damper which restrains a rotation speed of the flipping.

In the related art described above, viscous damping performance of an oil damper passing through the same rotating shaft may decrease due to welding heat generated when the rotating shaft of the hinge mechanism is welded to a frame. The present invention has been made to solve the above matters, and an object of the present invention is to enable a heat affected member to be appropriately assembled to a rotating shaft which is welded and connected to a seat hinge mechanism.

SUMMARY OF INVENTION

A vehicle seat hinge mechanism according to the present invention takes the following measures to solve the above matters.

That is, the vehicle seat hinge mechanism according to the present invention is a vehicle seat hinge mechanism configured to connect a vehicle seat to a vehicle body in a manner that allows the vehicle seat to rise and recline in a rotatable manner. The vehicle seat hinge mechanism includes: a base portion fixed to the vehicle body; a movable portion fixed to the vehicle seat; a rotating shaft which is passed through the movable portion and the base portion in a horizontal direction and is welded to one of the movable portion and the base portion while being rotatably supported by the other one of the movable portion and the base portion; a spiral spring which is passed through the rotating shaft and applies a rotational urging force to the movable portion; and a heat affected member which is passed through the rotating shaft and arranged with the spiral spring in an axial direction. The rotating shaft is divided into a first shaft portion, which is welded to the one of the movable portion and the base portion, and a second shaft portion, which is arranged on one axial direction side of the first shaft portion and welded to the one of the movable portion and the base portion. The first shaft portion includes an assembling portion which is capable of setting the heat affected member such that the heat affected member is passed from the one side in a state where the first shaft portion is welded to the one of the movable portion and the base portion and not welded to the second shaft portion.

According to the above configuration, the rotating shaft is divided into the first shaft portion and the second shaft portion, and the first shaft portion includes the assembling portion which is capable of setting the heat affected member in the state where the first shaft portion is welded to the one of the movable portion and the base portion, so that the heat affected member may be assembled to the rotating shaft, which is welded to the one of the movable portion and the base portion, without being affected by heat input.

The vehicle seat hinge mechanism according to the present invention may be further configured as follows. The spiral spring is set to pass through the second shaft portion in the axial direction.

According to the above configuration, the heat affected member and the spiral spring are assembled separately into the first shaft portion and the second shaft portion, so that shaft lengths of the first shaft portion and the second shaft portion may be shortened.

The vehicle seat hinge mechanism according to the present invention may be further configured as follows. The one of the movable portion and the base portion includes a pair of inner side plate portions facing each other in the axial direction, and the other one of the movable portion and the base portion includes a pair of outer side plate portions facing the pair of inner side plate portions from axial direction outer sides. The first shaft portion is passed through one of the inner side plate portion and one of the outer side plate portion in the axial direction, and the second shaft portion is passed through the other inner side plate portion and the other outer side plate portion in the axial direction. The spiral spring and the heat affected member are arranged between the pair of inner side plate portions.

According to the above configuration, a compact arrangement, in which the spiral spring and the heat affected member are accommodated between the pair of inner side plate portions, may be realized. Moreover, the first shaft portion and the second shaft portion may appropriately connect the base portion to the movable portion with both ends thereof supported.

The vehicle seat hinge mechanism according to the present invention may be further configured as follows. The second shaft portion includes an insertion portion into which an inner side end portion of the spiral spring may be inserted so as to prevent rotation. The first shaft portion includes a cylindrical fitting portion into which the insertion portion is inserted from the one side and fitted thereto.

According to the above configuration, the inner side end portion of the spiral spring may be rationally assembled to the second shaft portion. In addition, the insertion portion of the second shaft portion to which the spiral spring is assembled may be assembled to the fitting portion of the first shaft portion in a state where high structural strength may be exhibited.

DESCRIPTION OF EMBODIMENTS

Hereinafter, an embodiment of the present invention will be described with reference to the drawings.

First Embodiment

Schematic Configuration of Seat Hinge Mechanism 10

First, a configuration of a seat hinge mechanism 10 (corresponding to the "vehicle seat hinge mechanism" of the present invention) according to a first embodiment of the present invention will be described with reference to FIGS. 1 to 6. In the following description, front, rear, upper, lower, left, and right directions refer to directions shown in the drawings. A "seat width direction" refers to a left-right direction of a seat 1 to be described below.

Figure 1:
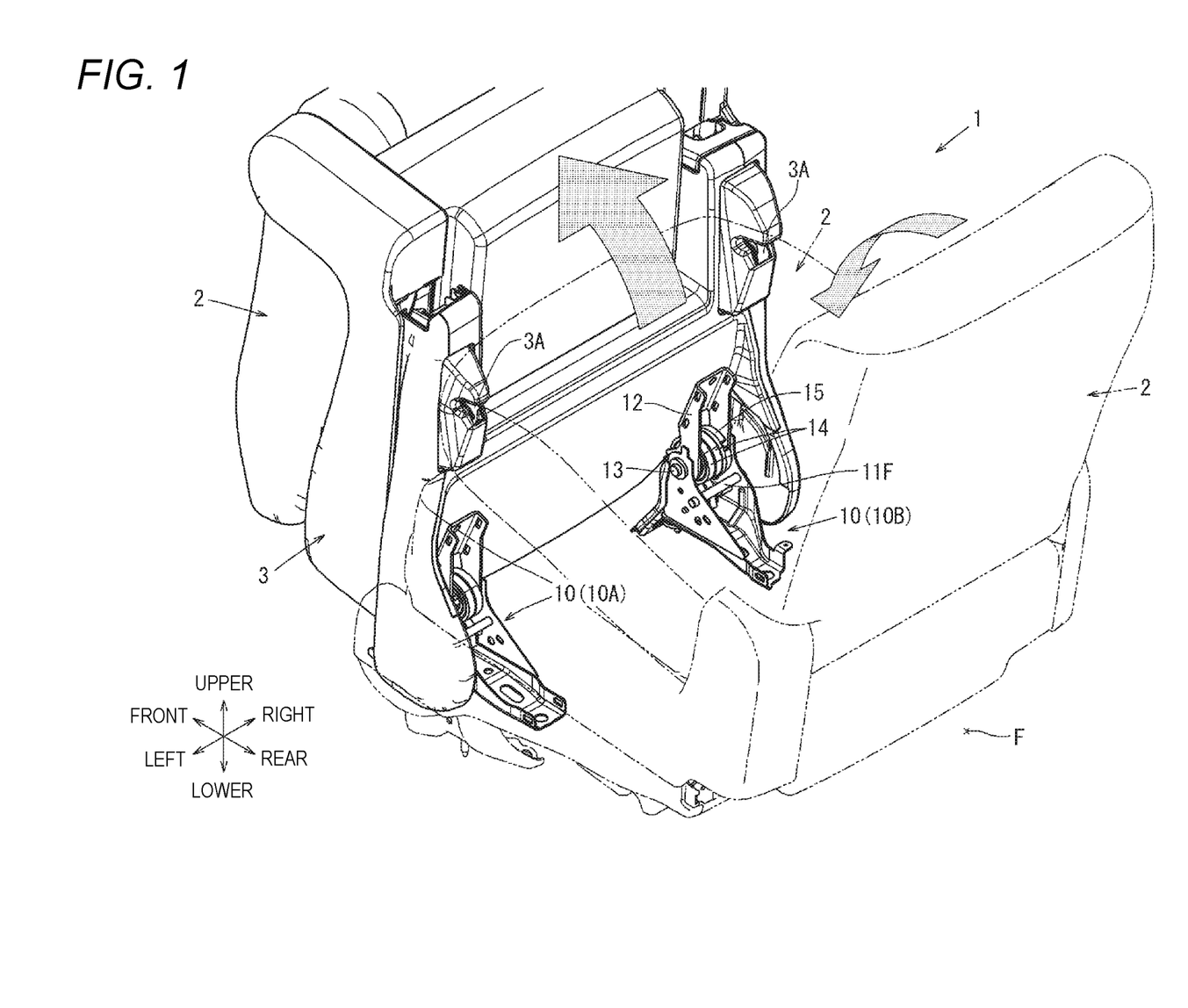
FIG. 1 is a perspective view showing a schematic configuration of a vehicle seat hinge mechanism according to a first embodiment.

As shown in FIG. 1, the seat hinge mechanism 10 according to the present embodiment is applied to the seat 1 (corresponding to the "vehicle seat" of the present invention) which forms a right seat of an automobile. The seat 1 includes a seat back 2, which forms a backrest portion of a seated occupant, and a seat cushion 3, which forms a seating portion. Left and right side lower end portions of the seat back 2 are connected to left and right side rear end portions of the seat cushion 3 via a recliner (not shown). As a result, a backrest angle of the seat back 2 with respect to the seat cushion 3 may be adjusted via the recliner (not shown).

Left and right side front end portions of the seat cushion 3 are connected to a floor F (corresponding to the "vehicle body" of the present invention) via the seat hinge mechanism 10 in a manner that allows the seat cushion 3 to rise and recline in a rotatable manner thereon. Cushion lock mechanisms 3A are provided at left and right side rear end portions of the seat cushion 3. The seat cushion 3 may be engaged with and disengaged from the floor F via the cushion lock mechanisms 3A. When the seat 1 is used for seating, the seat cushion 3 is reclined and locked on the floor F, and the seat back 2 is held in an upright position from the seat cushion 3.

However, when the seat 1 is not used for seating, the seat 1 is switched to the following tumble position by operating, by a user, a lever (not shown) provided on a right side portion of the seat cushion 3. That is, as for the seat 1, when the lever (not shown) is operated, the recliner (not shown) is unlocked, and the seat back 2 is reclined forward. Further, due to the forward reclining movement of the seat back 2, the cushion lock mechanisms 3A are unlocked, and the seat cushion 3 is flipped forward by the seat hinge mechanism 10 together with the seat back 2 which has reclined forward.

Due to the flipping, installation space of the seat 1 may be widened, and getting-on-and-off space of a rear seat (not shown) may be enlarged. The flipping of the seat 1 is assisted by an urging force of a spiral spring 14 provided in the seat hinge mechanism 10. A rotary type oil damper 15 is set in the seat hinge mechanism 10 so as to prevent a flipping speed of the seat 1, which is flipped by the spiral spring 14, from gaining excessive momentum.

Specifically, the seat hinge mechanism 10 includes an outer hinge 109 configured to connect the right side front end portion of the seat cushion 3 to the floor F, and an inner hinge 10A configured to connect the left side front end portion of the seat cushion 3 to the floor F. Two spiral springs 14 are provided in the outer hinge 103 and the inner hinge 10A, respectively, and the oil damper 15 is further provided in the outer hinge 10B. The two spiral springs 14 and the oil damper 15 may be assembled in an axial direction in a compact manner in the outer hinge 10B.

Specific Configuration of Seat Hinge Mechanism 10

Hereinafter, a specific configuration of the outer hinge 10B will be described in detail. As shown in FIGS. 1 to 4, the outer hinge 10B includes: a metal base portion 11 fixed on the floor F; a metal movable portion 12 fixed to a lower portion of the seat cushion 3; a metal rotating shaft 13 which passes through the base portion 11 and the movable portion 12 and extends in the seat width direction; and two spiral springs 14 and the oil damper 15 which pass through the rotating shaft 13 and are provided in the axial direction.

Figure 2:
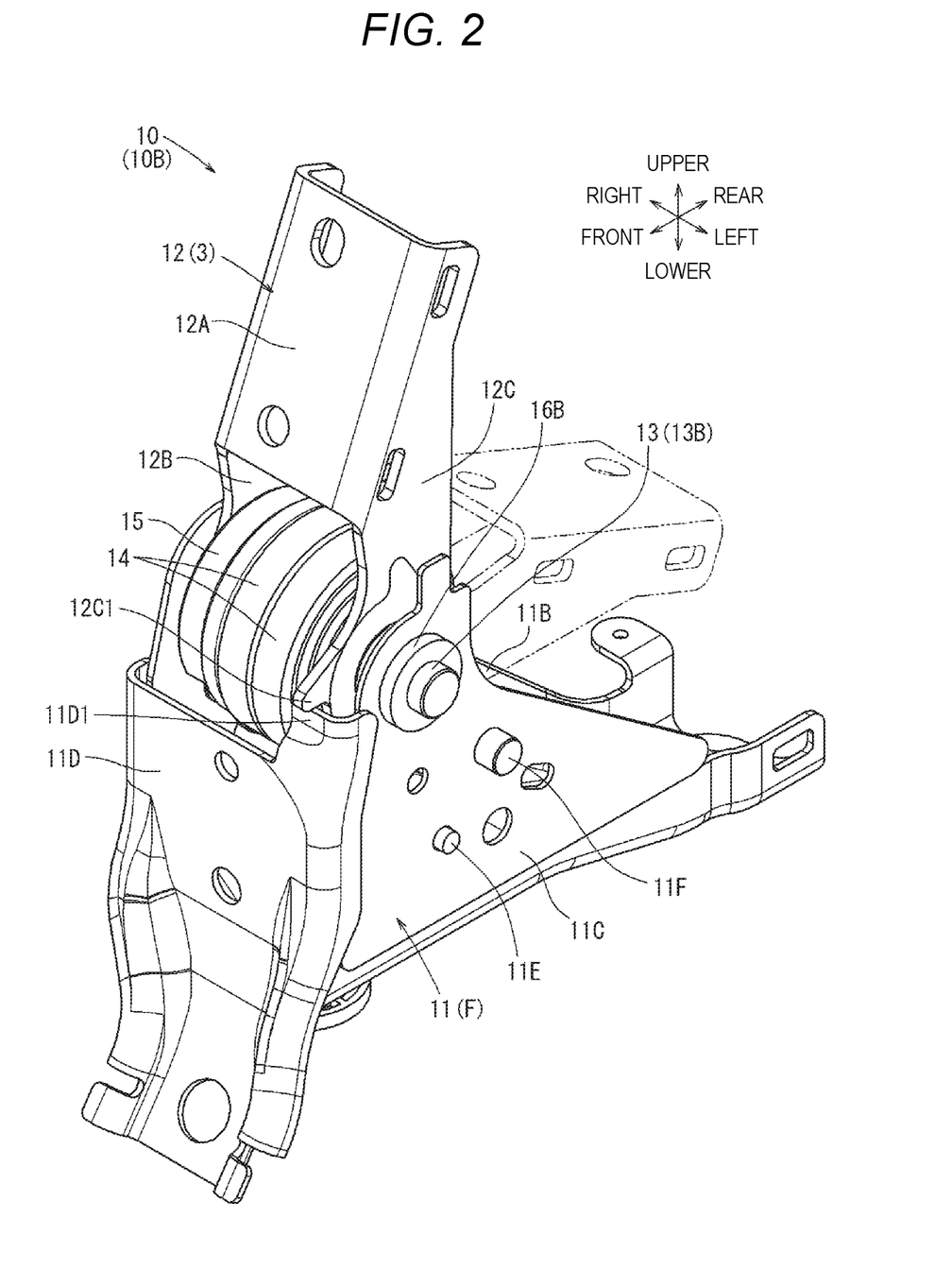
FIG. 2 is an enlarged perspective view of an outer hinge.
Figure 3:
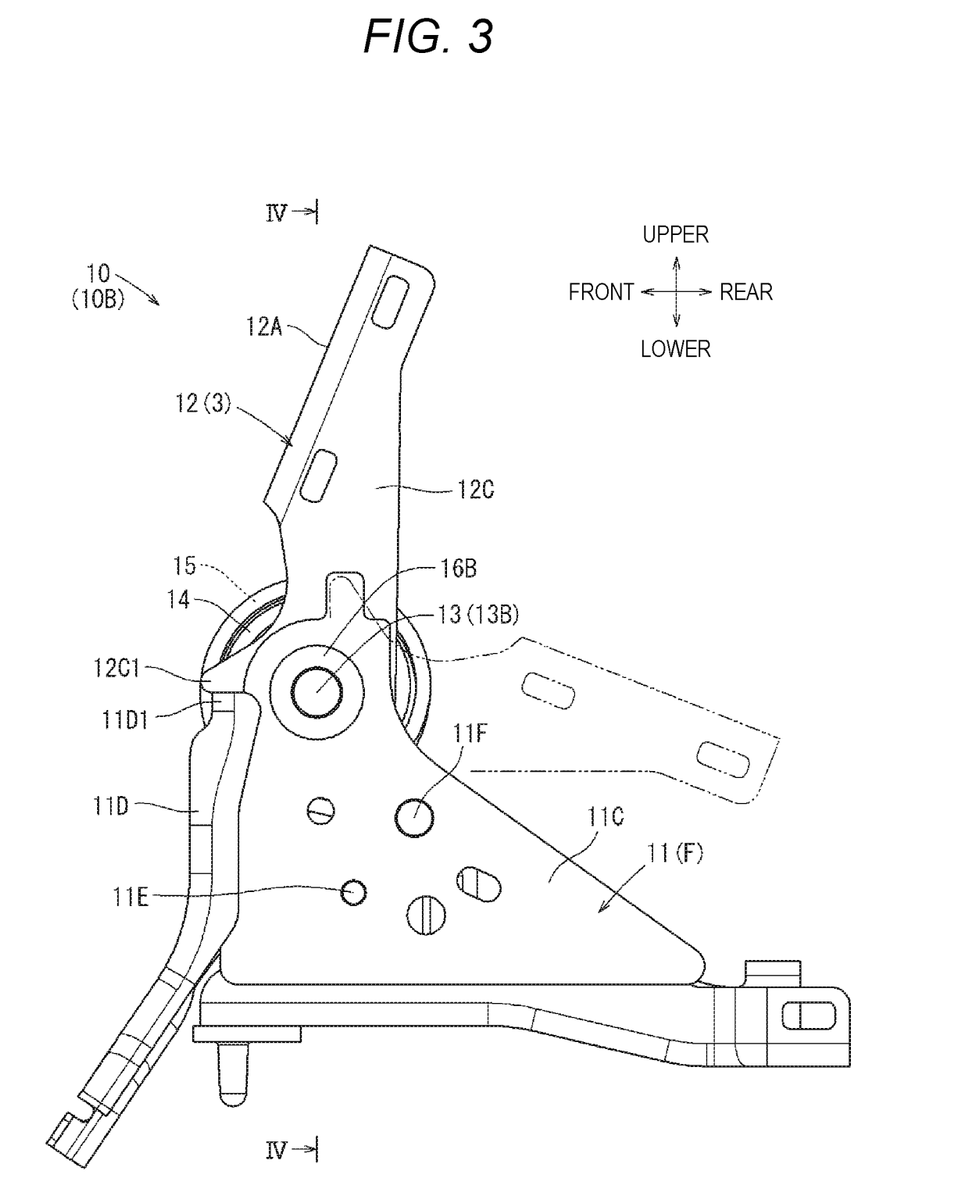
FIG. 3 is a left side view of the outer hinge.
Figure 4:
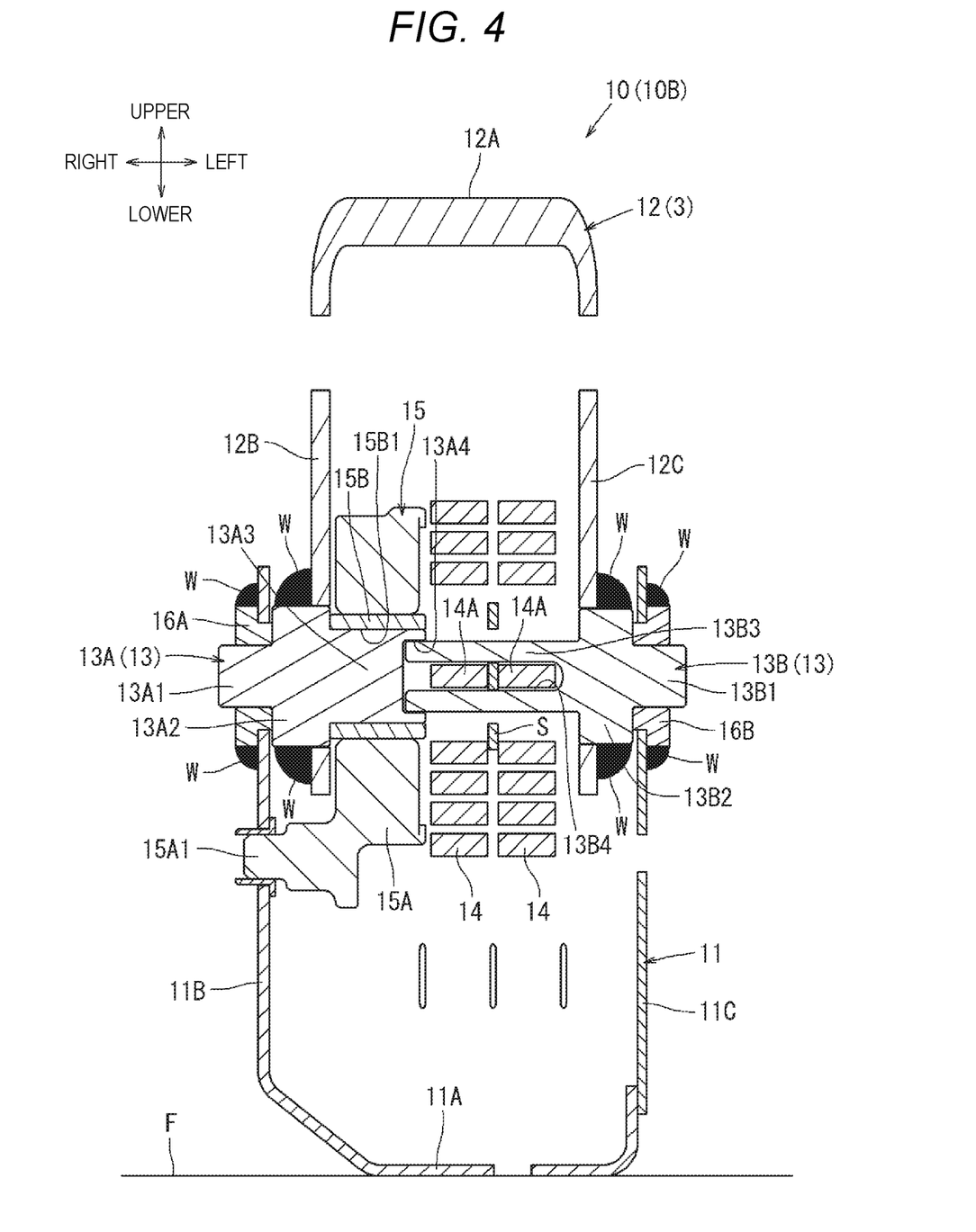
FIG. 4 is a cross-sectional view taken along line IV-IV of FIG. 3.
Figure 5:
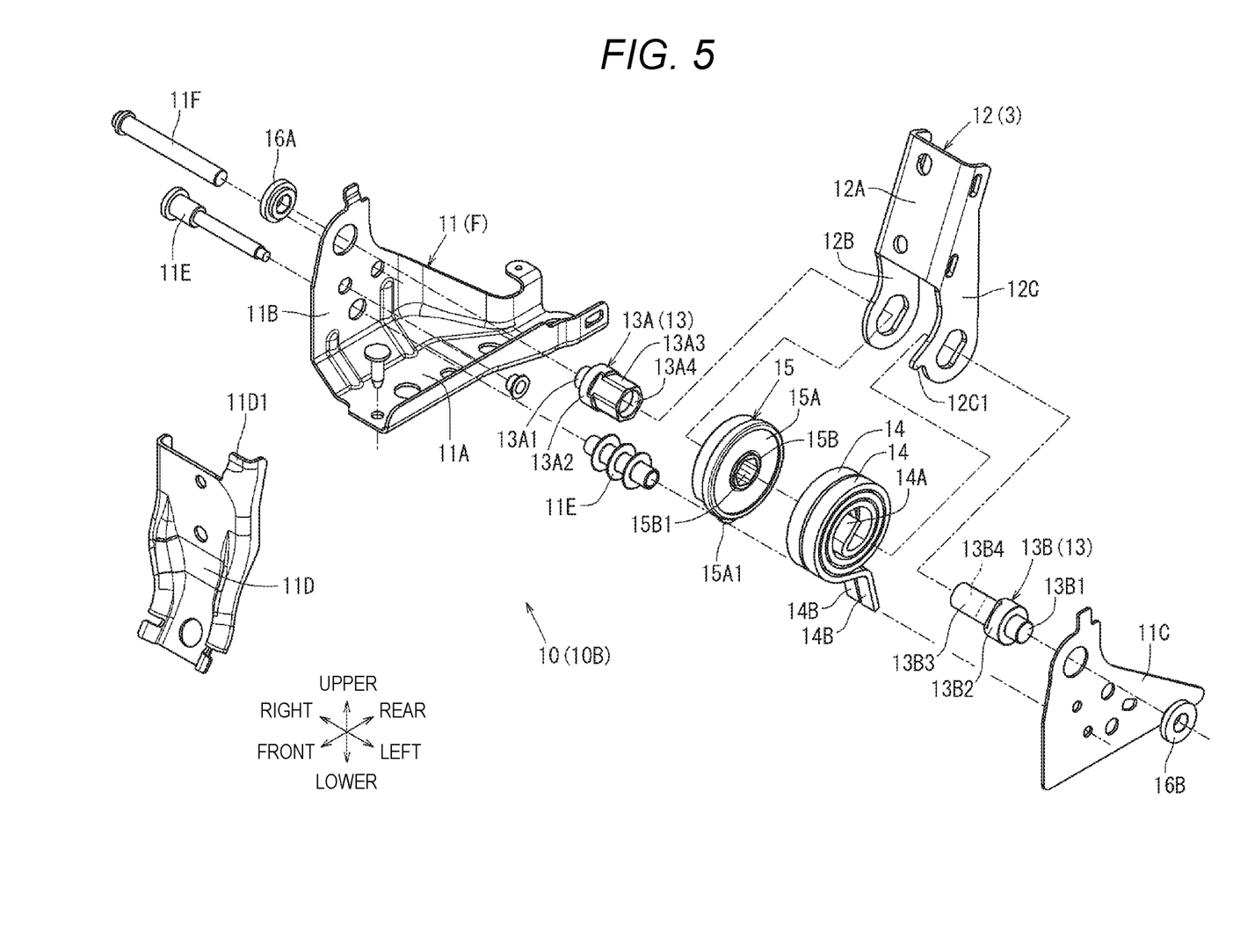
FIG. 5 is an exploded perspective view of the outer hinge.

As shown in FIGS. 4 and 5, the base portion 11 is formed of a substantially U-shaped plate member which includes a bottom plate portion 11A abutted against the floor F and fastened thereto by bolts, and outer side plate portion 11B, 11C rising from left and right side edge portions of the bottom plate portion 11A. As shown in FIG. 5, in the base portion 11, the bottom plate portion 11A and the right outer side plate portion 11B are made of one press material, the left outer side plate portion 11C is made of another one press material, and such portions are joined together by welding. As shown in FIG. 2, a patch 11D made of one pressing material is joined to a front portion of the base portion 11 to cover an opening of the U shape from the front.

As shown in FIGS. 1 to 3 and 5, a metal hook shaft 11E and a reinforcing shaft 11F extending in the seat width direction are passed through and connected to the base portion 11 in a manner of bridging between the two outer side plate portions 11B, 11C. The hook shaft 11E serves as a shaft portion configured to hook outer end portions 14B of the two spiral springs 14. The reinforcing shaft 11F serves as a reinforcing member which is bridged between the two outer side plate portions 11B, 11C of the base portion 11 so as to prevent the outer side plate portions 11B, 11C from being opened.

As shown in FIGS. 2 to 5, the movable portion 12 is formed of a substantially inverted U-shaped plate member which includes a top plate portion 12A abutted against a lower portion of the seat cushion 3 and fastened thereto by bolts, and inner side plate portions 12B, 12C hanging down from left and right side edge portions of the top plate portion 12A. As shown in FIG. 5, the movable portion 12 is formed of one press material. A stopper 12C1, which protrudes forward in a corner shape, is formed on the left inner side plate portion 12C of the movable portion 12. As shown in FIG. 2, the movable portion 12 rotates to a flipping position with respect to the base portion 11, so that the stopper 12C1 abuts against a locking portion 11D1 formed on the patch 11D of the base portion 11. As a result, the flipping of the movable portion 12 with respect to the base portion 11 is locked.

As shown in FIG. 4, the rotating shaft 13 is divided into left and right portions including a first shaft portion 13A and a second shaft portion 13B. The first shaft portion 13A is passed through the right outer side plate portion 11B of the base portion 11 and the right inner side plate portion 12B of the movable portion 12, so as to rotatably support the base portion 11 with respect to the movable portion 12. The second shaft portion 13B is passed through the left outer side plate portion 11C of the base portion 11 and the left inner side plate portion 12C of the movable portion 12, so as to rotatably support the base portion 11 with respect to the movable portion L. The first shaft portion 13A and the second shaft portion 13B are provided side by side on the same axis line, and are assembled in a state where the first shaft portion 13A and the second shaft portion 13B are inserted and fitted to each other in the axial direction.

In the first shaft portion 13A, the oil damper 15 is set through a leg portion 13A3 extending leftward from the right inner side plate portion 12B of the base portion 11. In the second shaft portion 13B, the spiral spring 14 is set through the leg portion 13B3 extending rightward from the left inner side plate portion 12C of the base portion 11. According to the above setting, the oil damper 15 and the spiral spring 14 are set in a state of being accommodated between the left and right inner side plate portions 12B, 12C of the base portion 11.

In the first shaft portion 13A, a cylindrical head portion 13A1, a flange portion 13A2 having a cylindrical shape larger than the head portion 13A1, and the leg portion 13A3 having a prismatic shape slightly smaller than the flange portion 13A2 are arranged concentrically in the axial direction from right to left. The head portion 13A1 forms a right end portion of the first shaft portion 13A, and is passed from a left side through the right outer side plate portion 113 of the base portion 11 and rotatably supported via a bush 16A. The bush 16A has a substantially cylindrical shape having a flange-shaped seat, and is passed from a right side through the outer side plate portion 11B and welded (welded portion W).

The flange portion 13A2 is passed through the right inner side plate portion 12B of the movable portion 12 in the axial direction and welded (welded portion W). The flange portion 13A2 is abutted against a left side surface of the right outer side plate portion 11B of the base portion 11, and functions as a spacer configured to secure an axial direction gap between the same outer side plate portion 11B and the right inner side plate portion 123 of the movable portion 12.

The leg portion 13A3 forms a left end portion of the first shaft portion 13A, and extends leftward from the same inner side plate portion 12B in a state where the first shaft portion 13A is set at a position to be welded to the right inner side plate portion 12B of the movable portion 12. As shown in FIG. 5, an outer peripheral portion of the leg portion 13A3 is passed through an angular hole-shaped through hole 15B1 formed in a center portion of the oil damper 15 from the left side, so as to set the oil damper 15 on the outer peripheral portion.

Specifically, the oil damper 15 includes a cylindrical housing 154 in which a viscous fluid is filled, and a relatively rotatable shaft 15B provided at a center portion of the housing 15A. The oil damper 15 has a configuration in which a load that causes the shaft 15B to rotate relatively with respect to the housing 15A is input from outside, so that the viscous fluid flows therein, and accompanying viscosity resistance exerts a restraining force on the relative rotation between the shaft 15B and the housing 15A.

In the oil damper 15, an angular hole-shaped through hole 15B1 formed in a center portion of the shaft 15B is passed through the leg portion 13A3 of the first shaft portion 13A from the left side, so that the same shaft 15B is integrally connected to the first shaft portion 13A in a rotation direction. Further, in the oil damper 15, as shown in FIG. 4, a locking pin 15A1 protruding rightward from the housing 15A is passed through the right outer side plate portion 11B of the base portion 11 from the left side, so that the housing 15A is integrally connected to the base portion 11 in the rotation direction.

Accordingly, when the movable portion 12 which is integrally welded to the first shaft portion 13A rotates with respect to the base portion 11, the oil damper 15 receives a load that causes relative rotation between the shaft 15B and the housing 15A. Here, the movable portion 12 corresponds to "the one of the movable portion and the base portion" of the present invention, and the base portion 11 corresponds to "the other of the movable portion and the base portion" of the present invention. The leg portion 13A3 corresponds to the "assembling portion" of the present invention. The oil damper 15 corresponds to the "heat affected member" of the present invention.

In the second shaft portion 13B, a cylindrical head portion 13B1, a flange portion 13B2 having a cylindrical shape larger than the head portion 13B1, and a leg portion 13B3 having a substantially cylindrical shape slightly smaller than the flange portion 13B2 are arranged concentrically in the axial direction from left to right. The head portion 13B1 forms a left end portion of the second shaft portion 13B, and is passed from a right side through the left outer side plate portion 11C of the base portion 11 and rotatably supported via a bush 16B. The bush 16B has a substantially cylindrical shape having a flange-shaped seat, and is passed from a left side through the outer side plate portion 11C and welded (welded portion W).

The flange portion 13B2 is passed through the left inner side plate portion 12C of the movable portion 12 in the axial direction and welded (welded portion W). The flange portion 13B2 is abutted against a right side surface of the left outer side plate portion 11C of the base portion 11, and functions as a spacer configured to secure an axial direction gap between the same outer side plate portion 11C and the left inner side plate portion 12C of the movable portion 12.

The leg portion 13B3 forms a right end portion of the second shaft portion 13B, and extends rightward from the same inner side plate portion 12C in a state where the second shaft portion 13B is set at a position to be welded to the left inner side plate portion 12C of the movable portion 12. A slit-shaped insertion hole 13B4 is formed in the leg portion 13B3 so as to divide an axial shape thereof into two parts in a radial direction. The insertion hole 1394 is formed in a straight line in the axial direction from a right end portion to a left end portion across the leg portion 13B3 on a central axis line, and is shaped to open the right end portion of the leg portion 13B3 to the right.

Inner end portions 14A of two spiral springs 14 are inserted into the insertion hole 13B4 of the leg portion 13B3 from the right side, so that the two spiral springs 14 are set in a state of being aligned in the axial direction around the leg portion 13B3. Specifically, due to the above assembly, the inner end portion 14A of each spiral spring 14 is connected to the leg portion 13B3 so as to be integrated with the leg portion 13B3 in the rotation direction. As shown in FIGS. 1 to 3 and 5, the outer end portions 14B of the spiral springs 14 described above are hooked to the hook shafts 11E which is connected to the base portion 11 as described above, and are integrally connected thereto in the rotation direction.

Accordingly, each spiral spring 14 is configured to constantly apply an urging force to the movable portion 12, which is integrally welded to the second shaft portion 13B, in the rotation direction of the flipping with respect to the base portion 11. As shown in FIG. 4, a spacer S, which has a substantially disk shape, is interposed between the spiral springs 14 to ensure an axial direction gap therebetween. The spacer S is set between the spiral springs 14 with a center portion thereof passed through the insertion hole 13B4 of the leg portion 13B3. Here, the leg portion 1393 corresponds to the "insertion portion" of the present invention.

The leg portion 13B3 is set at a position where the second shaft portion 13B is passed through and welded to the left inner side plate portion 12C of the movable portion 12, so that a right end portion of the leg portion 13B3 is inserted into a cylindrical recessed fitting portion 13A4 formed at a left end portion of the leg portion 13A3 of the first shaft portion 13A. Accordingly, the leg portion 13B3 of the second shaft portion 13B is supported by the leg portion 13A3 of the first shaft portion 13A in a state of being surrounded from an outer peripheral side. Accordingly, the leg portion 13B3 of the second shaft portion 13B is supported from the outer peripheral side by the fitting portion 13A4 of the first shaft portion 13A, so that opening of an opening in the right end portion, where the insertion hole 13B4 is formed, may be restrained.

Procedure for Assembling Seat Hinge Mechanism 10

Figure 6:
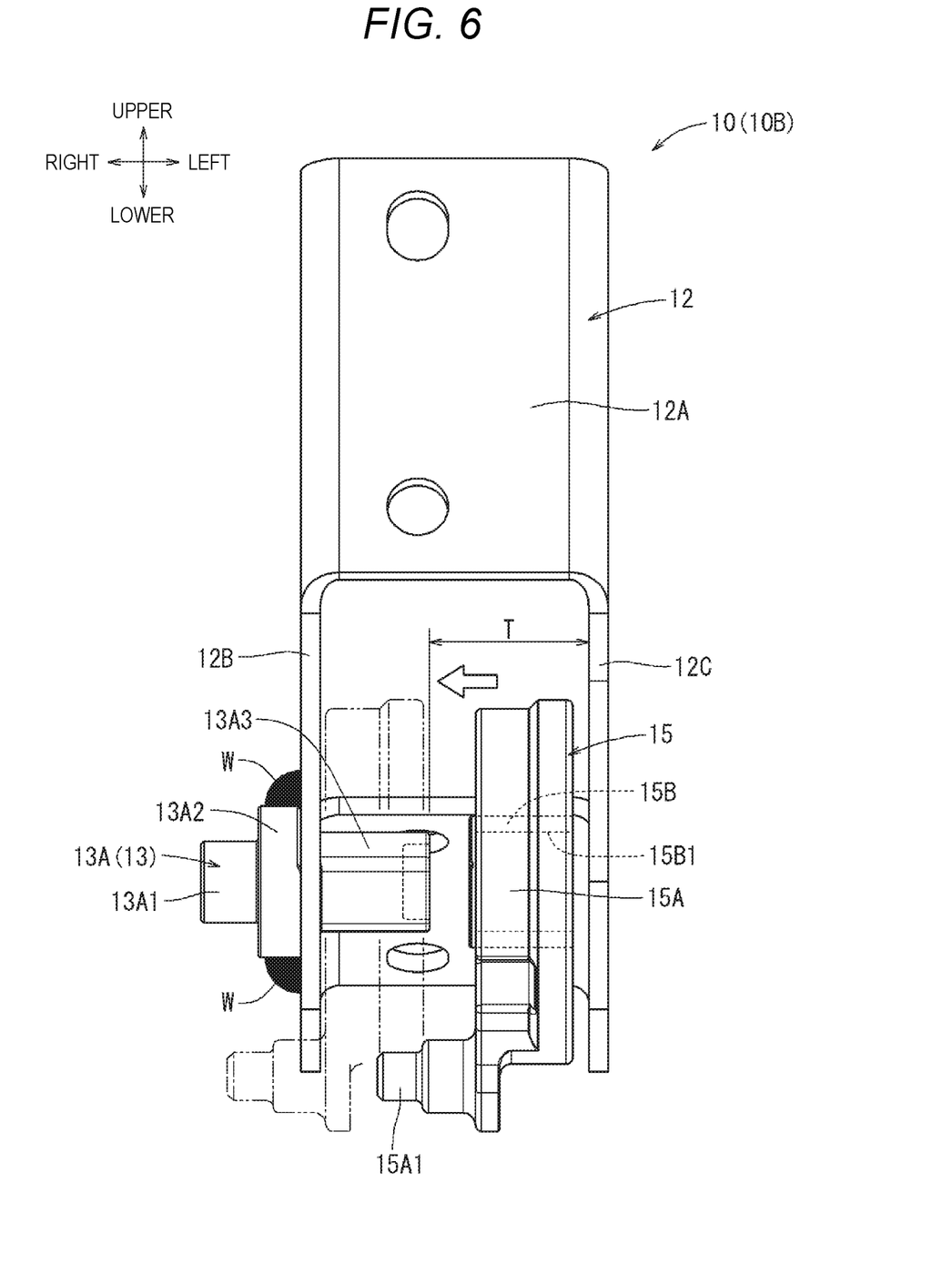
FIG. 6 is a front view showing a state where an oil damper is set on a first shaft portion.

The seat hinge mechanism 10 is assembled according to the following procedure. That is, first, as shown in FIG. 6, the right inner side plate portion 12B of the movable portion 12 is passed through and welded to the flange portion 13A2 of the first shaft portion 13A (welded portion W). By the same welding, the first shaft portion 13A is integrally connected to the right inner side plate portion 12B of the movable portion 12, and the leg portion 13A3 is set to extend leftward from the right inner side plate portion 12B. In the same state, the leftward extending end portion of the leg portion 13A3 does not reach the left inner side plate portion 12C of the movable portion 12, and an axial direction gap T is formed between the end portion and a right side surface of the left inner side plate portion 12C.

Next, the oil damper 15 is inserted into the gap T, and the through hole 15B1 of the oil damper 15 is set to pass through the leg portion 13A3 of the first shaft portion 13A from a left side. Thereafter, as shown in FIG. 4, the second shaft portion 13B is inserted into the left inner side plate portion 12C of the movable portion 12, and at the same time, the inner end portions 14A of the two spiral springs 14 are inserted and set in the leg portion 13B3. After the above setting, the flange portion 13B2 of the second shaft portion 13B is welded to the left inner side plate portion 12C of the movable portion 12 (welded portion W).

Further, the head portion 13A1 of the first shaft portion 13A assembled to the movable portion 12 is inserted into the right outer side plate portion 11B of the base portion 11, and the left outer side plate portion 11C of the base portion 11 is set to pass through the head portion 13B1 of the second shaft portion 13B. Finally, the left outer side plate 11C of the base portion 11 is welded to the bottom plate portion 11A of the base portion 11. By the above assembly, the movable portion 12 is assembled to the base portion 11 via the rotating shaft 13.

As described above, since the first shaft portion 13A is welded to the right inner side plate portion 12B of the movable portion 12 before the oil damper 15 is set in the leg portion 13A3, welding heat for welding the first shaft portion 13A to the movable portion 12 is not transmitted to the oil damper 15. Therefore, a decrease in viscous damping performance of the oil damper 15 caused by a thermal effect of the welding heat may be appropriately prevented.

Summary

In summary, the seat hinge mechanism 10 according to the present embodiment has the following configuration. That is, a vehicle seat hinge mechanism (10) is configured to connect a vehicle seat (1) to a vehicle body (F) in a manner that allows the vehicle seat (1) to rise and recline in a rotatable manner.

The vehicle seat hinge mechanism (10) includes: a base portion (11) fixed to the vehicle body (F); a movable portion (12) fixed to the vehicle seat (1); a rotating shaft (13) which is passed through the movable portion (12) and the base portion (11) in a horizontal direction and is welded to one (12) of the movable portion and the base portion while being rotatably supported by the other one (11) of the movable portion and the base portion; a spiral spring (14) which is passed through the rotating shaft (13) and applies a rotational urging force to the movable portion (12); and a heat affected member (15) which is passed through the rotating shaft (13) and arranged with the spiral spring (14) in an axial direction.

The rotating shaft (13) is divided into a first shaft portion (13A), which is welded to the one (12) of the movable portion and the base portion, and a second shaft portion (13B), which is arranged on one axial direction side of the first shaft portion (13A) and welded to the one (12) of the movable portion and the base portion. The first shaft portion (13A) includes an assembling portion (13A3) which is capable of setting the heat affected member (15) such that the heat affected member (15) is passed from the one side in a state where the first shaft portion (13A) is welded to the one (12) of the movable portion and the base portion and not welded to the second shaft portion (13B).

According to the above configuration, the rotating shaft (13) is divided into the first shaft portion (13A) and the second shaft portion (13B), and the first shaft portion (13A) includes the assembling portion (13A3) which is capable of setting the heat affected member (15) in the state where the first shaft portion (13A) is welded to the one (12) of the movable portion and the base portion, so that the heat affected member (15) may be assembled to the rotating shaft (13), which is welded to the one (12) of the movable portion and the base portion, without being affected by heat input.

The spiral spring (14) is set to pass through the second shaft portion (13B) in the axial direction. According to the above configuration, the heat affected member (15) and the spiral spring (14) are assembled separately into the first shaft portion (13A) and the second shaft portion (13B), so that shaft lengths of the first shaft portion (13A) and the second shaft portion (13B) may be shortened.

The one (12) of the movable portion and the base portion includes a pair of inner side plate portions (12B, 12C) facing each other in the axial direction, and the other one (11) of the movable portion and the base portion includes a pair of outer side plate portions (11B, 11C) facing the pair of inner side plate portions (12B, 12C) from axial direction outer sides. The first shaft portion (13A) is passed through one of the inner side plate portion (12B) and one of the outer side plate portion (11B) in the axial direction, and the second shaft portion (13B) is passed through the other inner side plate portion (12C) and the other outer side plate portion (11C) in the axial direction. The spiral spring (14) and the heat affected member (15) are arranged between the pair of inner side plate portions (12B, 12C).

According to the above configuration, a compact arrangement, in which the spiral spring (14) and the heat affected member (15) are accommodated between the pair of inner side plate portions (12B, 12C), may be realized. Moreover, the first shaft portion (13A) and the second shaft portion (13B) may appropriately connect the base portion (11) to the movable portion (12) with both ends thereof supported.

The second shaft portion (13B) includes an insertion portion (13B3) into which an inner side end portion (14A) of the spiral spring (14) may be inserted so as to prevent rotation. The first shaft portion (13A) includes a cylindrical fitting portion (13A4) into which the insertion portion (13B3) is inserted from the one side and fitted thereto.

According to the above configuration, the inner side end portion (14A) of the spiral spring (14) may be rationally assembled to the second shaft portion (13B). In addition, the insertion portion (13B3) of the second shaft portion (13B) to which the spiral spring (14) is assembled may be assembled to the fitting portion (13A4) of the first shaft portion (13A) in a state where high structural strength may be exhibited.

Other Embodiments

Although the embodiment of the present invention has been described above using one embodiment, the present invention may be implemented in various modes described below in addition to the above embodiment.

1. The vehicle seat hinge mechanism according to the present invention may be widely applied to seats used for various vehicles, such as vehicles other than automobiles, for example railway vehicles, aircraft, ships, and the like. Moreover, the vehicle seat hinge mechanism may be applied as a tumble mechanism that flips the entire seat forward in a state where the seat back is reclined forward, or may be applied as a space up mechanism that flips the entire seat laterally in the state where the seat back is reclined forward. The vehicle seat hinge mechanism may be configured to flip the seat cushion alone in a front-rear direction or laterally, instead of the entire seat. Moreover, the vehicle seat hinge mechanism may be configured to flip the entire seat laterally in a state where the seat back is reclined rearward instead of in the state of being reclined forward.

2. The vehicle body to which the base portion is fixed may be a side wall instead of the floor. Moreover, the vehicle seat to which the movable portion is fixed may be other seat configuration members, such as the seat back, instead of the seat cushion described above. An orientation of the rotating shaft is set to an appropriate horizontal direction according to the flipping direction of the movable portion.

3. Instead of the oil damper, the heat affected member may be formed of, for example, a resin spacer or rubber in which performance degradation may be caused by an influence of heat input of the welding heat.

4. The rotating shaft may not necessarily have a configuration in which the first shaft portion and the second shaft portion are inserted and fitted into each other in the axial direction. That is, the first shaft portion and the second shaft portion may be spaced apart from each other in the axial direction. In the concave-convex fitting structure between the first shaft portion and the second shaft portion, convex and concave portions may be set on either side. Moreover, the concave-convex fitting structure between the first shaft portion and the second shaft portion may be a fitting which is integrated in the rotation direction by the fitting of the concave and convex portions.

5. The rotating shaft may be welded to the base portion (the one of the movable portion and the base portion) and rotatably supported by the movable portion (the other one of the movable portion and the base portion).

6. One or three or more spiral springs may be provided. Moreover, the heat affected member, such as the oil damper, and the spiral spring may both be set in the first shaft portion.

What is claimed is:

1. A vehicle seat hinge mechanism configured to connect a vehicle seat to a vehicle body in a manner that allows the vehicle seat to rise and recline in a rotatable manner, comprising:
   a base portion that is fixed to the vehicle body;
   a movable portion that is fixed to the vehicle seat;
   a rotating shaft that is passed through the movable portion and the base portion in a horizontal direction and is welded to one of the movable portion and the base portion while being rotatably supported by the other one of the movable portion and the base portion;
   a spiral spring that is passed through the rotating shaft and applies a rotational urging force to the movable portion; and
   a heat affected member that is passed through the rotating shaft and arranged with the spiral spring in an axial direction,
   wherein the rotating shaft is divided into a first shaft portion that is welded to the one of the movable portion and the base portion, and a second shaft portion that is arranged on one axial direction side of the first shaft portion and welded to the one of the movable portion and the base portion, and
   the first shaft portion includes an assembling portion that is capable of setting the heat affected member such that the heat affected member is passed from the one side in a state where the first shaft portion is welded to the one of the movable portion and the base portion and the second shaft portion is not welded to the one of the movable portion and the base portion.

2. The vehicle seat hinge mechanism according to claim 1, wherein the spiral spring is set by being passed through the second shaft portion in the axial direction.

3. The vehicle seat hinge mechanism according to claim 1, wherein
   the second shaft portion includes an insertion portion into which an inner side end portion of the spiral spring is insertable so as to prevent rotation, and
   the first shaft portion includes a cylindrical fitting portion into which the insertion portion is inserted from the one side and fitted thereto.

4. A vehicle seat hinge mechanism configured to connect a vehicle seat to a vehicle body in a manner that allows the vehicle seat to rise and recline in a rotatable manner, comprising:
   a base portion that is fixed to the vehicle body;
   a movable portion that is fixed to the vehicle seat;
   a rotating shaft that is passed through the movable portion and the base portion in a horizontal direction and is welded to one of the movable portion and the base portion while being rotatably supported by the other one of the movable portion and the base portion;
   a spiral spring that is passed through the shaft and applies a rotational urging force to the movable portion; and
   a heat affected member that is passed through the rotating shaft and arranged with the spiral spring in an axial direction,
   wherein the rotating shaft is divided into a first shaft portion that is welded to the one of the movable portion and the base portion, and a second shaft portion that is arranged on one axial direction side of the first shaft portion and welded to the one of the movable portion and the base portion, and the first shaft portion includes an assembling portion that is capable of setting the heat affected member such that the heat affected member is passed from the one side in a state where the first shaft portion is welded to the one of the movable portion and the base portion and not welded to the second shaft portion, wherein the one of the movable portion and the base portion includes a pair of inner side plate portions facing each other in the axial direction, the other one of the movable portion and the base portion includes a pair of outer side plate portions facing the pair of inner side plate portions from axial direction outer sides, the first shaft portion is passed through one of the inner side plate portion and one of the outer side plate portion in the axial direction, the second shaft portion is passed through the other inner side plate portion and the other outer side plate portion in the axial direction, and the spiral spring and the heat affected member are disposed between the pair of inner side plate portions.

* * * * *